Feb. 8, 1966   G. R. COWAN ETAL   3,233,312
EXPLOSIVELY BONDED PRODUCT

Filed Aug. 3, 1962   3 Sheets-Sheet 1

INVENTORS
GEORGE R. COWAN
ARNOLD H. HOLTZMAN
BY
John F. Schmitz
ATTORNEY

United States Patent Office 3,233,312
Patented Feb. 8, 1966

3,233,312
EXPLOSIVELY BONDED PRODUCT
George R. Cowan, Woodbury, and Arnold H. Holtzman, Cherry Hill, N.J., assignors to E. I. du Pont de Nemours and Company, Wilmington, Del., a corporation of Delaware
Filed Aug. 3, 1962, Ser. No. 217,776
23 Claims. (Cl. 29—194)

This is a continuation-in-part of application Serial No. 65,194, filed October 26, 1960, now Patent No. 3,137,937 issued June 23, 1964 which in turn, is a continuation-in-part of application Serial No. 6,793, filed February 4, 1960, now abandoned.

The present invention relates to a novel process for bonding of metals. Specifically, the invention involves a method for bonding metal surfaces and in particular for cladding a metal surface with one or more layers of the same or another metal and to novel articles of manufacture which are produced by this process.

The use of clad, or composite, metals as materials of construction has become, in recent years, a well-established practice. Such clad materials consist of a base metal, usually relatively inexpensive, to the surface of which is bonded or clad a layer of a second metal which possesses certain desirable properties, e.g., high corrosion or oxidation resistance, not characteristic of the base metal. In most instances, the metal which forms the cladding layer is considerably more costly than is the base metal to which it is applied. Hence a considerable economic saving is made possible by the use of a thin layer rather than a thick layer of the costly metal. Naturally, this saving is greatly increased when clad materials are employed in the construction of large pieces of equipment such as pipe lines, storage tanks, and processing vessels for large chemical plants.

A second advantageous feature of the use of clad metals results from the fact that frequently the metal possessing the desired corrosion resistance or other property is lacking in the necessary tensile strength, thermal properties, or compression strength to enable it to be employed per se in applications where stress will be encountered. Thus, in addition to the economy provided by the use of the less expensive metal, the structural strength and rigidity which it may impart to the composite system represent an important and valuable factor in composite assemblies.

In addition to the aforementioned uses for clad or composite metals, this invention has specific application to, among others, X-ray equipment, cooking vessels, and decorative trim for automobiles and buildings. For example, in many cases, it would be desirable to protect such metals as molybdenum, tungsten, and their alloys, which are primarily used for high temperature applications, by a layer of an oxidation resistant material such as "Nichrome."

A variety of methods exist for bonding one metal to the surface of another to form a composite multilayered assembly; however, each of these methods suffers from certain disadvantages which cause them to be disadvantageous or wholly unsuitable, under certain circumstances.

The oldest of the commercial processes for applying a layer of a metal to another metal is that commonly known as "hot-dipping," or when applied to zinc coatings, "galvanizing." Essentially, the method consists of immersing the article to be coated in a bath of molten metal for a short time. It is necessary for successful coating that the two metals alloy with each other at least to some extent. The disadvantages of the hot-dipping method are: (1) it is difficult to control accurately the thickness of the outer layer or its distribution over the surface; and (2) certain metals do not alloy with others, or alternately form deleterious brittle phases, which makes the production of a continuous layer with combinations of such metals impossible from a practical standpoint. Owing to the difficulties associated with the handling of large quantities of molten metals of high melting points, for example, copper, nickel, tungsten, and cobalt, as well as the possibility of causing undesirable thermal changes in the base metal, the hot-dipping method has been severely limited to the application of metals of relatively low melting points.

Another well-known process for applying a layer of one metal to another is electroplating. In this process, the article to be plated, after careful cleaning, is immersed in a solution of a compound of the metal of which a coating is desired, and subsequently an electric current is passed through the solution, the object to be plated serving as the cathode. In electroplating, adherent layers are obtainable whose thickness is easily controlled, and the deposited layer generally is of high purity. However, the process is time-consuming and expensive, and, additionally, porosity of the deposited layer and embrittlement problems arising from the hydrogen produced impose serious limitations on the use of electro-deposited coatings for many applications. Moreover, the process is not readily adaptable to depositing coatings from alloys.

Vapor deposition is a third process for applying a layer of one metal to another, but this technique has found use in a limited number of situations because of the costly special procedures and exacting control required. The coatings produced by the process are generally adherent, flexible, and of a high degree of purity. Some elements such as silicon, tellurium, and selenium, which are difficult to deposit by other methods, can be vapor deposited.

A fourth and more common method of bonding one metal to another involves direct rolling of one layer onto another with the application of heat and pressure. Although several variations of this roll-cladding technique are used commercially for the production of clad sheets, wires, strips, and so forth, all suffer from certain serious shortcomings. First, the process is limited as to those metals that can form an effective bond under the pertinent conditions. Indeed, there are some combinations of metals, for example, tungsten and niobium, for which none of the bonding processes presently known is efficacious. Second, under the extreme temperature conditions required for effective hot rolling, highly undesirable, brittle intermetallic compounds often are formed or other undesirable effects, such as adsorption of embrittling agents from the surrounding atmosphere, often occur. Hence, a further disadvantage of direct rolling results because costly and difficult techniques, such as gas-tight welding, inert or evacuated atmospheres, and elaborate rolling machinery are required.

Thus, a primary object of the present invention is to provide a process for bonding metal surfaces to each other. A further object is to provide a means whereby virtually any two or more metals or metal alloys may be bonded together to form a composite multilayered system. A still further object of the invention is the provision of clad metal systems wherein the cladding layer is nonpervious, uniform, and adherent, by a method that is convenient and economical. A still further object of this invention is to provide unique clad assemblies from metals which heretofore could not be bonded effectively together. As the invention is described, other objects will become evident.

We have found that the above-described objects are achieved when we support a layer of cladding metal parallel to a surface of a metal to be clad, the inside surface of said layer of cladding metal being spaced from the surface of said metal to be clad, place on the outer surface of said layer of cladding metal a layer of a detonating explosive having a velocity of detonation less than 120% of the velocity of sound in that metal in the system having the highest sonic velocity, and thereafter initiate said explosive layer. Usually it is desirable to use an explosive having a detonation velocity not greater than the velocity of sound in that metal with the high sonic velocity, and this represents the preferred embodiment of the invention. The metal layers must be separated from each other a distance at least sufficient for the explosively propelled layer to achieve an adequate velocity before impact with the stationary layer. A spacing of 0.001 inch between the facing surface of the two layers represents the minimum spacing which we have found will consistently be adequate. The maximum separation allowable is dependent entirely upon the reduction of velocity of the propelled layer caused by air between the layers. By increasing the explosive loading or by evacuating the space between the layers, spacings much greater than 0.001 inch are feasible. In general, however, separation of more than 0.5 inch is not convenient or necessary.

The products of this invention are multilayered metallic articles of manufacture comprising at least two metallic layers bonded together to form a composite system by a bonding layer comprising a homogeneous alloy intermediate in composition between said metallic layers that it bonds. The bonding layer in the products of this invention is substantially diffusionless, i.e., there is an abrupt change in composition across each interface therein, and the composite system has a shear strength of greater than about 75% of that of the weaker metal in the system before cladding.

By the term "composite system" is meant a metallic composite defined by alternating layers of like, or unlike, metals each bonded to its complementary metallic layer by a distinct intermediate bond zone of homogeneous alloy. This homogeneous alloy consists essentially of the substance of the material that it bonds.

By the term "bonding layer," as used herein, is meant a continuous bond extending across at least about 90% of the area of each interface which may be characterized as either a substantially continuous layer of homogeneous alloy or a zone having discrete and relatively periodic regions of homogeneous alloy spaced between substantially continuous direct metal to metal bonding.

The composite systems of this invention are defined as conventional mill prodcts; i.e., plate, sheet, strip, rod, bar, tubing, etc., and are characterized in that they exhibit a shear strength of greater than about 75% of the shear strength of the weaker metal in the system before cladding and as exhibiting virtually no separation along the bonded interface in the system when bent by the conventional Bend Test with the bond under tension and compression, where the bend radius is twice the thickness of the composite, to an angle greater than about 75% of that possible with the less ductile layer component in the system.

The alloy region of the respective bond zones in the instant clad or composite system are readily defined as multi-component, inter-atomic mixtures of the substance of the metallic cladding and backer layers and as possessing characteristic structures which, while not always absolutely distinct, are generally defined by swirl patterns and a columnar nature. It exhibits the typical cast structure that would be expected by extremely rapid melting and resolidification of thin layers of a mixture of the clad and backer materials. The bond zone does not exhibit separate phases of metals that in certain non-solid solution systems; e.g., iron-titanium, would normally be predicted on the basis of equilibrium conditions from the Constitution Diagram.

The bond zone is essentially diffusionless in nature; i.e., the extent of metallic inter-diffusion at the bond zone along any interface is less than the limit of measurement obtainable with the best electron probe and metallographic techniques (taper sectioning) less than 0.2 micron. Additionally, the bond zone is unique in its non-equilibrium structure and exhibits substantially uniform, continuous chemical and physical properties throughout.

By the terms "backer or backer layer" is meant that metallic layer against which the other, metallic layer or cladding layer, is explosively propelled. It is obvious, of course, that if the composite of this invention consists of more than two metal layers, several of these will function as both backer and cladding layers depending upon which particular bond zone one might have reference to.

Reference is now made to the attached drawing for a more complete understanding of the invention in which.

Figure 1:
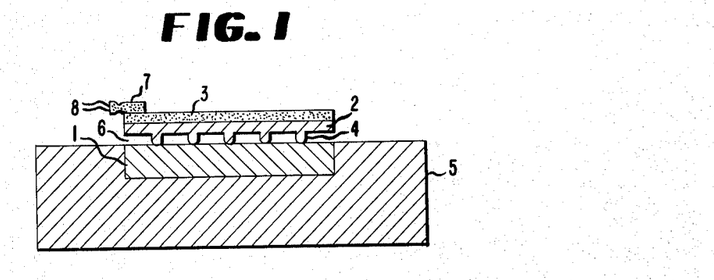
FIGURE 1 represents a cross-sectional view of an assembly which may be used to practice the invention.

In FIGURE 1, the metal layer to be clad is indicated by 1. The layer 1 is embedded in a supporting medium 5 of a hard gypsum cement. Cladding layer 2 is supported above base layer 1 by small dimples 4 in the surface of cladding layer 2. This provides the required spacing between the two layers indicated by 6. A layer of a detonating explosive 3 is positioned above and contiguous to layer 2 and to one edge of the explosive layer is attached initiator 7 having lead wires 8.

Figure 2:
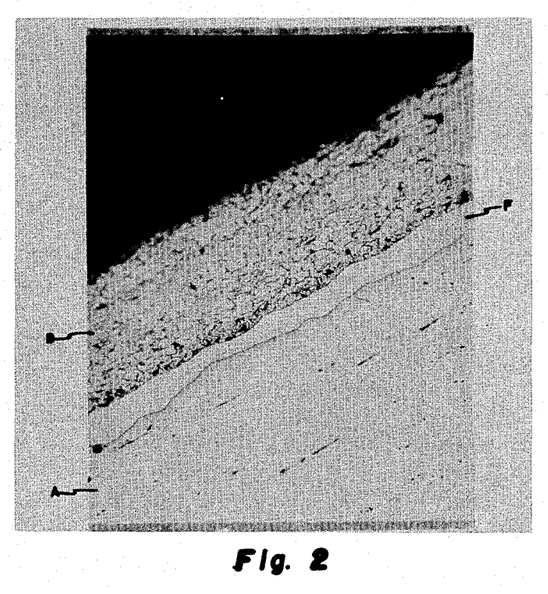
FIGURE 2 is a photomicrograph (magnification of 450) of a bimetallic assembly prepared in accordance with the assembly.

In the photomicrograph of FIGURE 2, A indicates a base layer of molybdenum, B indicates a cladding layer of low carbon steel, and F indicates the bonding zone composed of material from layers A and B.

Figure 3:
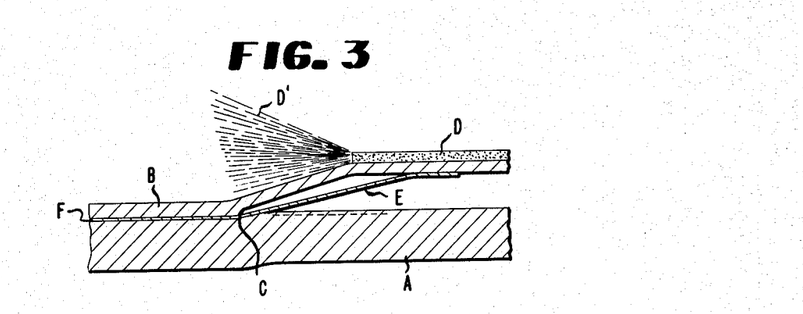
FIGURE 3 represents a schematic depiction of the phenomenon which is believed to occur in the course of the present process.

In FIGURE 3, A represents the metal base layer, B represents the metallic cladding layer, D represents the layer of explosive before detonation, and D' represents the gaseous detonation products following detonation of layed D, E represents a sharp liquid stream of material composed of both layer A and layer B which impinges on the underside of layer B just ahead of the impact point C, and F represents the material immobilized between the layers A and B and bonding these layers together.

Figure 4:
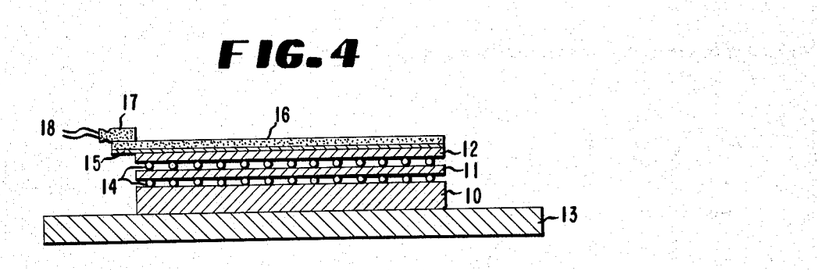
FIGURE 4 represents a typical assembly for the preparation of multilayered systems.
Figure 5:
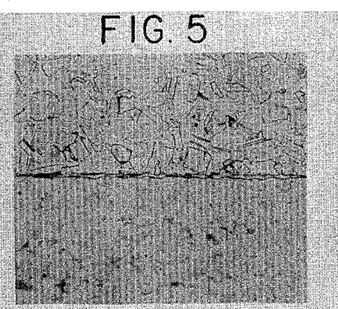
FIGURES 5 to 11 are photomicrographs (magnification of 125) of bond zones of composite systems of this invention.
Figure 6:
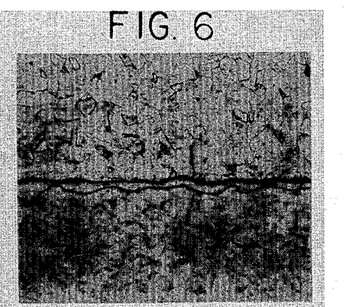
Figure 7:
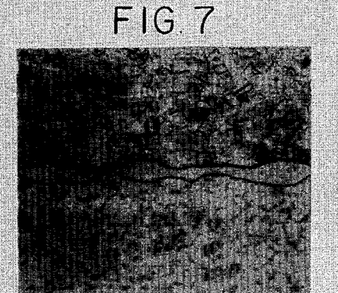
Figure 8:
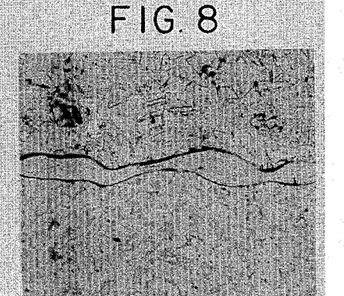
Figure 9:
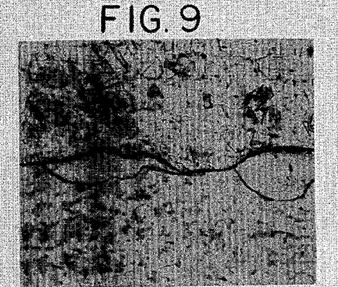
Figure 10:
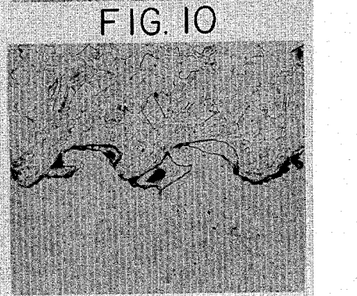
Figure 11:
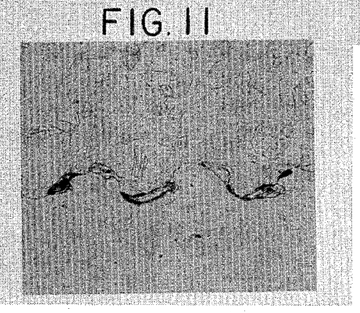

FIGURE 4 represents an assembly for the preparation of assemblies having more than two layers. Metal layer 10 which is to be clad by metal sheets 11 and 12 is resting on a plywood support 13. Metal layers 10, 11, and 12 are separated by a standoff space maintained by tiny metallic particles 14. A layer of tape, polystyrene foam, or other inert material 15 covers the upper surface of layer 12 to protect it from the direct effects of explosive layer 16. The explosive is initiated by initiator 17 attached at one corner of the explosive and having lead wires 18. Explosive layer 16 may extend somewhat beyond the topmost cladding layer to provide a convenient portion for attaching the initiator and to insure that the detonation front will have achieved maximum velocity when it is adjacent the edge of the cladding assembly.

FIGURES 5 to 11 show, by photomicrographs, the variance of the bond zone of the instant invention as a result of the variance of standoff. Each of the figures is taken of a clad system composed of 0.125 inch type 304 stainless steel clad on 1 inch mild steel effected by using a 0.875 inch layer of grained 80/20 Amatol having a detonation velocity equal to about 3900 meters per second in each instance. The standoff used in producing the clad of FIGURE 5 was 3 mils whereas the respective standoffs used in producing the systems of FIGURES 6 through 11 were 9 mils, 15 mils, 21 mils, 21 mils, 27 mils, and 27 mils, respectively. Thus, the bond zone of the instant invention varies from a thin continuous layer of substantially uniform width, through a thick continuous layer, to one having discrete relatively periodic regions or pockets of homogeneous alloy separated by substantially continuous direct metal to metal bonding. The nature of the bond zone is then a factor of the amount of standoff and the velocity of the explosive used; nevertheless, all of such bonding is meant to be, and is, included in and a part of the instant invention.

The following examples illustrate some of the many combinations of metals that can be bonded together by the method of the present invention. They are intended as illustrative only, however, and are not to be considered as exhaustive or limiting. Any desired composite metallic system may be obtained by a suitable adjustment of conditions.

EXAMPLE 1

The explosive employed in this example was a thin uniform sheet of a flexible explosive composition comprising 20% very fine pentaerythritol tetranitrate (PETN), 70% red lead, and, as a binder, 10% of a 50/50 mixture of butyl rubber and a thermoplastic terpene resin [mixture of polymers of β-pinene of formula $(C_{10}H_6)_n$], commercially available as "Piccolyte" S-10 (manufactured by the Pennsylvania Industrial Chemical Corporation). Complete details of this composition and a suitable method for its manufacture are disclosed in co-pending application Serial No. 65,012 filed October 26, 1960, now Patent No. 3,043,521, in the name of Cyril J. Breza and having a common assignee with the present application. The composition is readily rolled into sheets and detonates at a velocity of about 4100 meters per second.

A mild steel plate, 6 inches by 9 inches and 0.5 inch thick, was placed on a plywood slab. Above this plate and spaced therefrom a distance of 0.125 inch by rectangular steel spacers at each corner was placed in corresponding dimensional alignment a 6 inch by 9 inch by 0.125 inch plate of stainless steel. The outer surface of this plate was covered with a layer of masking tape as a guard against marring of the final surface. A dimensionally conforming layer of the above-described explosive having a weight per unit area of 15 grams per square inch was placed over the layer of masking tape. A commercial line wave generator, as described in U.S. Patent No. 2,943,571, issued July 5, 1960, was attached to one side of the rectangular explosive layer and subsequently initiated. After detonation of the explosive, the mild steel and the stainless steel were found to be firmly and uniformly bonded together to form a composite assembly. Microscopic examination revealed excellent bonding. Tests carried out according to prescribed A.S.T.M. Method No. A265-44T on the assembly to determine the shear strentgh of the bond gave an average shear strength of 73,500 p.s.i. The minimum shear strength prescribed by A.S.T.M. specifications for this type of clad is 20,000 p.s.i. and those produced by common conventional means usually exhibit a shear strength of from 30,000 to 35,000 p.s.i. The composite could be bent 180° around a mandrel whose diameter was equal to twice the thickness of the composite without separation.

EXAMPLE 2

A 24 inch by 24 inch by 0.75 inch plate of mild steel was placed on a supporting block of plywood. One surface of a 24 inch by 24 inch by 0.0313 inch sheet of type 304 stainless steel was covered with masking tape and was placed, tape-side up, on the mild steel plate and spaced therefrom a distance of 0.0059 inch by a few scattered particles of iron powder which had been sieved to pass through a No. 100 mesh screen and held on a No. 200 mesh screen. The surface of the tape was then covered completely with granular TNT at a distribution of 5.2 grams per square inch and a density of 0.8 gram per cubic centimeter. Initiation of the explosive was by a No. 6 electric blasting cap positioned at a corner of the layer. The layer of granular TNT detonated at a velocity of about 4200 meters per second. After detonation of the explosive, the resulting 24 inch by 24 inch stainless-on-mild steel composite, when examined, exhibited complete, firm bonding across better than 95% of any interface, and a shear strength of 45,000 p.s.i. The composite could be bent 180° around a mandrel, whose thickness was equal to twice the thickness of the composite, without separation.

EXAMPLE 3

A 0.25-inch-thick nickel layer was applied to a 1-inch-thick plate of mild steel in the following manner. A 6 inch by 9 inch plate to mild steel was placed on a plywood support block. Particles of iron powder screened as in Example 2 were placed at intervals on the upper surface of the mild steel to provide a standoff distance of 0.0059 inch. One surface of the nickel cladding layer was covered with a protective layer of masking tape to insure against minor deformation of marking of the surface by the explosive force. The layer of tape was in turn covered with a layer of the explosive composition described in Example 1, having a weight per unit area of 30 grams per square inch, and the nickel-tape-explosive composite was placed, nickel-side-down and in dimensional alignment, on the steel plate. A No. 6 electric initiator was attached to one corner of the explosive layer, and the explosive was denoted. A nickel-mild steel assembly having excellent bonding of the two metallic layers was obtained. The clad system exhibited a shear strength of 35,000 p.s.i. and could be bent 180° around a mandrel equal in thickness to twice the thickness of the composite without separation occurring.

EXAMPLE 4

The technique and explosive composition of Example 3 were used to prepare a 3 inch by 3 inch composite of molybdenum-on-type 304 stainless steel. The thickness of the molybdenum cladding layer was 0.040 inch, and that of the stainless steel 0.0625 inch. The weight per unit area of the explosive layer used was 15 grams per square inch, and the standoff space provided was 0.0059 inch. An excellent clad was achieved.

EXAMPLE 5

A 0.0625-inch layer of copper was clad onto a 0.5 inch-thick plate of mild steel in the following manner. The copper sheet which measured 3 inches by 6 inches was covered on one side with a one-inch-thick layer of polystyrene foam and the polystyrene layer was covered with layer of the explosive composition of Example 1 having a weight distribution of 10 grams per square inch. The edges of the copper-polystyrene-explosive "sandwich" were sealed with waterproof tape, and the sandwich was placed on the mild steel plate with a spacing between the copper layer and the steel layer of 0.0138 inch provided by uniform particles of iron powder. The iron particles had been screened to pass through No. 45 mesh and were held on No. 100 mesh. The edges of the completed assembly also were sealed with tape, and an electric initiator was attached at one corner of the explosive layer. The assembly was then immersed in water, and the explosive was initiated. Excellent bonding of the copper onto the steel plate resulted, i.e., examination revealed complete, firm bonding across greater than 95% of the area of any interface. The composite exhibited a shear strength of 22,000 p.s.i. The composite could be bent as in Example 3 with similar results.

EXAMPLE 6

The procedure of Example 5 was used to prepare a titanium-on-copper clad. The dimensions of the sheets were 3 inches by 6 inches; the titanium layer was 0.050 inch thick and the copper layer was 0.0625 inch thick. The spacing, which in this case was provided by particles of screened titanium powder, was 0.0138 inch, and the weight of the explosive was 10 grams per square inch. Following detonation of the explosive, the titanium and copper sheets were firmly and uniformly bonded over at least 95% of the total area of any interface in the system and had a shear strength of 20,000 p.s.i.

EXAMPLE 7

A 0.050 inch titanium layer was clad to a 0.5 inch plate of mild steel by the procedure described in Example 5. The dimensions of the layers were each 3 inches by 6 inches, the weight of the explosive was 15 grams per square inch, and the spacing of 0.0017 inch was provided by uniform particles of iron powder (through No. 325 mesh). The clad obtained was strong and uniform.

EXAMPLE 8

The procedure of Example 5 again was employed to apply a 0.125-inch aluminum layer to a 0.5 inch plate of mild steel. The layers were each 3 inches by 6 inches, the explosive layer distribution was 15 grams per square inch, and the spacing was 0.0059 inch. Following detonation of the explosive, the layer of aluminum was firmly bonded to the mild steel across at least 95% of the total area of any one interface and exhibited a shear strength of 10,000 p.s.i. It could also be bent 180°, using the conventional Bend Test and a radius twice the thickness of the composite with no separation.

EXAMPLE 9

A 0.010 inch tantalum layer was clad onto a 4 inch by 5 inch plate of 0.5 inch mild steel by the procedure of Example 5. The conditions were: 0.0059 inch spacing; 10 grams per square inch of explosive. An excellent clad resulted.

EXAMPLE 10

The procedure of Example 5 was employed to prepare a 6 inch by 9 inch composite of 0.0625-inch "Hastelloy C" on 0.5 inch mild steel. The explosive sheet was a slightly modified version of the composition of Example 1, having a weight per unit area of 15 grams per square inch; it contained 72% red lead, 8% binder, and 20% PETN and detonated at a velocity of about 4000 meters per second. The spacing provided between the "Hastalloy C" and the mild steel layers was 0.0138 inch, and initiation of the explosive layer was accomplished, in this instance, by a line-wave generator. The system, when tested, revealed a shear strength of 42,000 p.s.i. and exhibited complete, firm bonding over at least about 95% of the total area of any interface in the system. Employing the conventional Bend Test, and a radius twice the thickness of the composite, the system could be bent 180° without separation.

EXAMPLE 11

A 3 inch by 6 inch tantalum-on-copper clad assembly was prepared by using the technique of Example 5. The thickness of the tantalum layer was 0.010 inch, and the thickness of the copper layer was 0.0625 inch. The explosive weight was 10 grams per square inch, and the spacing provided was 0.0059 inch.

EXAMPLE 12

A 48 inch by 96 inch stainless steel on mild steel clad was prepared by the technique of Example 5. The explosive composition was that used in Example 10, and the weight distribution was 12½ grams per square inch. A spacing of 0.0138 inch was used. The cladding layer was 0.0313 inch in thickness, and the base layer was 0.75 inch thick.

EXAMPLE 13

An explosive composition containing 35% PETN, 50% red lead, and 15% of the butyl rubber-terpene resin binder of Example 1 was employed. This composition also is readily rolled into flexible sheets and has a detonation velocity of about 5000 meters per second. A mild steel plate, 10 inches by 10 inches and 0.050 inch thick, was embedded in a block of a hard gypsum cement. Above this plate was positioned in dimensional alignment a 10 inch by 10 inch by 0.050 inch plate of magnesium; the magnesium plate having several uniform surface dimples which served to support it at a distance above the steel base plate of 0.020 inch. A dimensionally conforming layer of the aforementioned explosive containing an explosive loading of 3 grams per square inch was placed on the top surface of the magnesium plate, and a commercial No. 6 electric initiator was attached to an edge of this explosive layer and subsequently initiated. Upon examination of the composite plate formed, the two layers were found to be firmly and uniformly bonded together. Microscopic examination revealed no cracks or defects in the bond, and efforts to separate the layers mechanically were unsuccessful.

EXAMPLE 14

The procedure and explosive and amount thereof described in Example 13 were used to apply a 0.003-inch titanium layer to an 0.050-inch aluminum sheet. The dimensions of the layers were 10 inches by 10 inches and the spacing distance was 0.015 inch.

EXAMPLE 15

An Inconel-on-mild steel composite was prepared by the procedure and explosive and amount thereof of Example 13. Both the steel and Inconel layers were 0.050 inch in thickness, and their dimensions were 10 inches by 10 inches. The spacing distance was 0.020 inch. The composite possessed complete, firm bonding across better than 95% of any interface and a shear strength of 42,000 p.s.i. The composite could be bent 180° around a mandrel, whose thickness was equal to twice the thickness of the composite without separation.

EXAMPLE 16

A layer of 0.001-inch "Nichrome" was firmly clad to a tungsten base layer by the procedure of Example 13. The amount and explosive used was that of Example 10, and the spacing distance used was 0.003 inch. The tungsten layer was 0.050 inch thick.

EXAMPLE 17

A Nichrome on molybdenum clad was prepared by the procedure of Example 16 using a 0.050 inch layer of molybdenum in place of the tungsten layer.

EXAMPLE 18

A 0.003-inch clad of a 90/6/4 titanium/aluminum/vanadium alloy was applied to a 1 inch by 1 inch by 0.050 inch piece of tungsten by the procedure described in Example 13. The spacing was 0.003 inch and the explosive and amount was that of Example 13. The bond formed was excellent.

EXAMPLE 19

A 0.007-inch layer of an 80/10/10 alloy of niobium/titanium/molybdenum was clad to a 1 inch by 1 inch by 0.050 inch sheet of molybdenum by means of the procedure and explosive of Example 13 with a spacing of 0.010 inch.

EXAMPLE 20

A molybdenum plate 0.100 inch thick and 1 inch by 4 inches was placed on a steel supporting plate. A 1 inch by 4 inch by 0.005 inch mild steel sheet was supported directly above the molybdenum plate at a distance of 0.025 inch by means of dimples in the corners of the steel sheet. A 1 inch by 4 inch layer of the explosive of Example 13 having an explosive loading of 2 grams per square inch was glued to the upper surface of the steel sheet. After initiation of the explosive at one edge the two metals were observed to be firmly bonded together, no evidence of cracking being detectable.

EXAMPLE 21

A sheet of titanium 6 inches wide by 10 inches long by .008 inch thick, was rolled around a cylindrical iron mandrel with an overlap of about 1 inch. An edge of the sheet was provided with small indentations so that the two intersecting edges were separated by an air gap. A strip of the explosive of Example 13 equal in length to the length of the sheet was positioned contiguous to the overlapping edge of the sheet and initiated at one end of the strip. The titanium tube thus formed was uniform and without cracks or other imperfections. The seam was of excellent mechanical strength, and metallurgical examination revealed no discontinuities.

EXAMPLE 22

Stainless steel of 0.029 inch thickness was clad to molybdenum and to tungsten substrates by means of the procedure of Example 13 utilizing the explosive composition of Example 1. The spacing was 0.015 inch in each case, the dimensions of the metal layers were 2 inches by 2 inches. and the thicknesses of the molybdenum and tungsten base layers were 0.039 inch and 0.021 inch, respectively.

EXAMPLE 23

A layer of titanium of 0.040 inch thickness was clad to Inconel by the procedure of Example 22. The Inconel base layer was 0.055 inch in thickness. The spacing was 0.015 inch and the dimensions of the layers were 2 inches by 2 inches. Good bonding was achieved.

The following Examples 24 through 33 illustrate the application of the process of the present invention in connection with the preparation of multilayered or "sandwich"-type clad systems, i.e., assemblies having more than two layers. In each of these examples, the explosive composition used was the 70% red lead-20% PETN-10% binder composition of Example 1.

EXAMPLE 24

A 6 inch by 9 inch by 0.5 inch plate of type 1015 steel was placed on a supporting block of plywood. A 0.018 inch copper layer of corresponding dimensions was placed on the steel plate supported and spaced therefrom a distance of 0.0059 inch by iron particles. Then a 0.0625 inch thick layer of stainless steel was positioned on the copper layer and also spaced therefrom a distance of 0.0059 inch by iron particles. The exposed upper surface of the stainless steel layer was covered with a protective layer of tape and then with a sheet of the explosive having a weight distribution of 10 grams per square inch. An electric initiator was attached to one corner of the explosive sheet, and the explosive was detonated. Examination of the resulting stainless steel-copper-1015 steel composite showed that firm metallurgical bonding has been produced at both interfaces. No deformation or surface distortion was detectable.

EXAMPLE 25

A 6 inch by 9 inch stainless steel-copper-mild steel-yellow brass composite was prepared in the manner described in Example 24, utilizing spacing at each interface of 0.0059 inch, and an explosive distribution of 20 grams per square inch. The thicknesses of the stainless, copper, mild steel, and yellow brass layers were, respectively, 0.0625, 0.0625, 0.0625, and 0.125 inch.

EXAMPLE 26

A composite, 6 inches by 9 inches, of 0.0625 inch stainless steel-on-0.0313 inch aluminum-on-0.5 inch mild steel was prepared by the procedure of Example 24. The spacing provided at each interface was 0.0059 inch and the explosive distribution was 15 grams per square inch.

EXAMPLE 27

A 6 inch by 9 inch stainless steel-mild steel-brass-mild steel composite was prepared by means of the technique described in Example 24. The spacing at each interface was 0.0059 inch, the explosive distribution was 20 grams per square inch, and the thickness of the stainless steel, mild steel, brass, and mild steel layers was, respectively, 0.0625, 0.012, 0.0313, and 0.5 inch.

EXAMPLE 28

A 6 inch by 9 inch, 5-layered composite article of manufacture composed of stainless steel-on-mild steel-on-copper-on-mild steel-on-stainless steel was prepared in the manner described in Example 24. The thickness of the layers was: stainless layers, 0.0625 inch; mild steel layers, 0.012 inch; copper, 0.0625 inch. The spacing between the layers was 0.0059 inch and the explosive distribution was 20 grams per square inch.

EXAMPLE 29

A 12 inch square titanium-on-copper-on stainless steel composite article of manufacture was prepared as follows. A 0.0625 inch copper layer was supported on a 0.008 inch layer of stainless steel at a distance of 0.0029 inch by particles of iron powder (through No. 200 mesh, held on No. 325 mesh). Similarly, a 0.003 inch titanium layer was positioned above the copper layer at a distance of 0.0029 inch maintained by iron particles. The upper surface of the titanium was covered with polyethylene terephthalate film ("Mylar" polyester film manufactured by E. I. du Pont de Nemours & Co.) of 10 mil thickness, and the edges of the entire assembly were waterproofed by the application of tape. A sheet of the explosive, weight distribution 15 grams per square inch, was glued to the inside bottom surface of an open box designed to fit over the assembly of metal layers. The inside depth of the box was sufficient to provide a space of ¾ inch between explosive layer and titanium layer when the box was inverted and firmly fixed over the metal layers. An initiator was attached to the explosive sheet at one corner, the box positioned over the metal layers, the entire assembly was submerged in water, and the initiator was detonated. The composite formed was heated to 550° C. and held at this temperature for 10 minutes. After cooling in air to room temperature, the composite was bent 90° around a cylindrical mandrel. No cracking or separation occurred.

EXAMPLE 30

The technique of Example 29 was used to prepare a 6 inch by 6 inch, 16-layered laminate composed of alternating layers of 0.005 inch mild steel and 0.005 inch austenitic stainless steel. The explosive distribution was 10 grams per square inch, and the spacing provided between each layer was 0.0059 inch. A one-inch thick water layer between the explosive and the uppermost metallic layer was employed. The laminate thus produced, was uniformly bonded, and no imperfections or irregularities were observable.

EXAMPLE 31

A 3 inch by 6 inch aluminum-on-copper-on-mild steel composite article of manufacture was prepared by using an explosive layer of 15 grams per square inch and a spacing (provided by uniform particles of iron powder) between each of the metallic layers of 0.0059 inch. The upper surface of the aluminum was protected by a 1-inch layer of polystyrene foam, the edges of the assembly sealed by tape, and the assembly was submerged in water when the explosive was detonated. The aluminum, copper, and mild steel layers were 0.125, 0.0625, and 0.5 inch thick, respectively.

EXAMPLE 32

A tantalum-on-copper-on-mild steel composite article of manufacture 4 inches by 5 inches was prepared by using a polystyrene foam protective layer and immersing the assembly in water before shooting as described in Example 31. The spacing used was 0.0138 inch, and the explosive weight was 15 grams per square inch. The thickness of the metallic layers was: tantalum, 0.010 inch; copper, 0.0625 inch; and mild steel, 0.5 inch.

EXAMPLE 33

The explosive composition of Example 1 was used to prepare a 3 inch by 6 inch silver-on-mild steel composite. The explosive distribution was 12½ grams per square inch, and the technique described in Example 29 was employed to provide a ¼-inch water layer between the explosive layer and the silver. A spacing of 0.0328 inch between the steel and silver was provided by particles of iron powder (through No. 20 mesh, held on No. 45), and initiation was accomplished by a line-wave generator.

Although we do not intend to be limited by any theory of operation, we believe the bonding phenomenon described above is attributable to a "jetting" action which occurs, as illustrated schematically in FIGURE 3. When the explosive layer is initiated, the detonation proceeds throughout the remainder of the explosive layer at the detonation velocity of the explosive composition. The pressures produced by the detonation thus act progressively on the layer of cladding material to propel it toward the material to be clad. If the layer of cladding metal is parallel to the surface of the metal to be clad, that portion of the cladding metal nearest the point or points of initiation will make contact with the surface of the metal to be clad while other portions are either stationary or enroute to the surface (see FIGURE 3). If the conditions are appropriate, a "jet" composed of surface layers of both metals will be produced, this jet being directed into the as yet unoccupied space between the layer of cladding metal and the surface of the metal being clad. The jetted material is recirculated to give intimate mixing of the two metals. The removal of the metal surface layers and the coalescence under high pressure of previously underlying metal results in the desired bonding.

Effective bonding will not be obtained if the cladding metal layer impacts in gross by traveling in a direction generally normal to the surface of the metal to be clad. Such conditions will prevail in the case of parallel metal layers in which one layer is driven by an explosive that is initiated essentially simultaneously over its entire surface, as by a plane wave generator, or if an explosive charge is positioned a substantial distance, i.e., more than a few inches, from the cladding layer and the pressure is transmitted through a relatively dense medium. In the latter case, the effect of the spacing would be to approximate simultaneous initiation over the entire surface. In order to achieve the desired result, an explosive layer must be initiated so that the detonation is propagated parallel to the cladding layer. Naturally, the dimensions of the explosive layer must correspond to the dimensions of the area where cladding is desired.

An essential and critical feature of the present invention is the use of an explosive having a detonation velocity not greater than about 120% of the velocity of sound in that metal of the system having the highest sonic velocity. By "metal" in the previous sentence, we mean metallic component or layer of the cladding system which in any instance may be either an elemental metal or a mixture of elemental metals, i.e., an alloy. When the detonation velocity of the explosive exceeds this limitation, oblique shock waves often ensue which eliminate the "jet" phenomena referred to above and prevent formation of a good metal-to-metal bond. Also, in those cases where a jet does form, pronounced secondary effects often result, such as distortion of the plates and cracking of the bonding layer.

While we have referred repeatedly hereinabove to the "velocity of sound" and the "sonic velocity" of metals, those skilled in the art will recognize that these terms have somewhat different meanings in differing circumstances. For example, these terms will have a different significance to the physicist when dealing with plastic shock wave phenomena in solids as contrasted with elastic shock wave phenomena. It is the former with which we are concerned for purposes of the present invention. The terms "velocity of sound" and "sonic velocity" as used throughout this application in connection with metals and metallic systems refer to the velocity of the plastic shock wave which forms when a stress which is applied just exceeds the elastic limit for unidimensional compression of the particular metal or metallic system involved. The value of this sonic velocity may be obtained by means of the relation $$V = \sqrt{K/d}$$

where "V" is the sonic velocity in cm./sec.; "K" is the adiabatic bulk modulus in dynes/cm.$^2$; and "d" is the density in g./cm.$^3$ Values of "K" may be obtained from values of Young's modulus, "E" and Poisson's ratio, "γ" by means of the relation $$K = E/(1-2\gamma)$$

Values of "d" and "K" or "E" and "γ" are readily available in the literature (see for example, American Institute of Physics Handbook), McGraw-Hill, New York, 1957).

Alternatively, the sonic velocity may be ascertained from published values of the velocity of the plastic shock wave as a function of the particle velocity imparted to the metal by the shock wave in the manner described by R. G. McQueen and S. P. Marsh, Journal of Applied Physics 31 (7), 1253 (1960).

In those cases where literature data are unavailable, values of "V" may be obtained by carrying out shock wave measurements as described by R. G. McQueen and S. P. Marsh (loc. cit.) and in references cited by them. Alternatively "V" may be ascertained from the relation $$V = \sqrt{C_L^2 - (4/3)C_s^2}$$

where "$C_L$" is the velocity of elastic compressional waves and "$C_s$" is the velocity of elastic shear waves in the metal. The required velocities of the elastic waves may be measured by well-known methods. For illustration purposes, sonic velocity values as used herein for representative metals are set forth in the following table:

| Metal: | Sonic velocity, m./sec. |
|---|---|
| Zinc | 3000 |
| Copper | 4000 |
| Magnesium | 4500 |
| Niobium | 4500 |
| Austenitic stainless steel | 4500 |
| Nickel | 4700 |
| Titanium | 4800 |
| Iron | 4800 |
| Molybdenum | 5200 |
| Aluminum | 5500 |

In addition to the maximum limitation on the detonation velocity of the explosive used, we have found that the latter must have a minimum detonation velocity of at least about 1200 meters per second. Explosive compositions which detonate at a velocity lower than this will often fail to develop the energy necessary for formation of the "jet" postulated above, and will thus fail to firmly bond the metals within the sense and scope of the present invention.

As shown by the examples, the novel bonding process is applicable to a wide variety of metals, such as aluminum, steel, iron, titanium, niobium, chromium, cobalt, nickel, beryllium, magnesium, molybdenum, tungsten, tantalum, vanadium, zirconium, silver, platinum, copper, gold, and their alloys, and other metals, many of which are very difficult to bond by any of the conventional techniques. Each of the layers may be of a single metal, or they may be alloys of two or more individual metals, or either of the layers may be a composite of two or more single layers.

Not only is the process suitable for the preparation of flat plates or sheets but also, as shown by Example 21, the preparation of tubes and other shapes from difficultly weldable material is possible. In commercial practice the base layer will often be an implement or unit of equipment to which the cladding layer is to be affixed. The ductility of the bonded material is comparable to that of the non-bonded layers and may often times be increased by mild heat treatment.

A particularly surprising and advantageous feature of the novel clad systems of the present invention is that the continuous bonding zone joining the two layers will be of homogeneous composition throughout. In conventional cladding methods, the bonded zone is composed of a gradated sequence of compositions which are progressively richer in the metal of the layer that is closest and, conversely, progressively poorer in the layer which is farthest away. The following example illustrates this aspect of the invention.

EXAMPLE 34

A series of 26 nickel-on-copper clads was made by using the explosive of Example 1 at a distribution of 5 grams per square inch, and the spacing between the nickel and copper layers was varied in increments from 0.0017 to 0.160 inch. The explosive sheet was spaced ¼ from the cladding layer and the space was filled with water according to the technique described in Example 29. The metal layers measured 4 inches by 4 inches by 0.021 inch. Subsequent X-ray diffraction studies carried out on the jetted zone of each of the clads showed that in each case was produced an identical face-centered cubic structure. The lattice parameter obtained for the jetted material was 3.575±0.003 A. regardless of the spacing employed and irrespective of the portion of the jetted zone examined. A copper-nickel composition having a lattice parameter of 3.575 A. is composed of 37.6% nickle by weight and 62.4% copper by weight. The composite had a shear strength of 22,000 p.s.i. and was bonded over at least about 95% of the total area of any interface. It could be bent 180° around a mandrel of a radius twice the thickness of the composite without separation.

EXAMPLE 35

A gold on nickel composite article of manufacture was prepared as follows. A strip of 14 karat yellow gold alloy 30 inches by 3 inches and 0.06 inch thick was supported substantially uniformly a distance 0.045 inch over a 30 inches by 3 inches backer layer of low carbon nickel having a thickness of 1.5 inches. The exposed or upper layer of the gold strip was covered with a protective layer of masking tape to insure against minor deformation or surface marking and a 0.75 inch thickness of explosive having a loading of 10 grams per square inch and composed of 80/20 Amatol and 0.5% Cab-O-Sil was placed on top of the taped surface of the gold sheet. An electric initiator was attached to one edge of the explosive layer and the explosive was detonated. The nickel-gold clad system thus formed had a completeness of bonding greater than 96%, i.e., more than 96% of all of the interface area of both the nickel and the gold sheets was firmly bonded together by a bonding layer as was defined earlier.

The composite so formed was cold rolled to an 80% reduction in thickness and annealed at a temperature of 1200° F. Detailed examination revealed that while the cold rolling and annealing steps had resulted in the thickness of the composite being reduced to 0.0012 inch, no separation of the bond had occurred. The composite was bent 180° around a mandrel of a radius twice the thickness of the clad without separation.

EXAMPLE 36

The following table lists clad systems and their measured definitive values.

*Clad system*

| Cladding Metal | Backer Metal | Shear Strength | Bend,[1] degrees | Percent Bond |
|---|---|---|---|---|
| Type 304 Stainless Steel. | Copper | 22,000 | 180 | 95 |
| Type A55 Titanium | Steel | 40,000 | 125 | 95 |
| Do | Copper | 22,000 | 125 | 95 |
| Copper | Type 1100-0 Aluminum. | 10,000 | 180 | 95 |
| Type 304 Stainless Steel. | do | 10,000 | 180 | 95 |
| Inconel | Nickel | 35,000 | 180 | 95 |
| Type 304 Stainless Steel. | do | 35,000 | 180 | 95 |
| Nickel | Aluminum | 10,000 | 180 | 95 |

[1] In all cases the conventional Bend Test is employed with the clad system under tension and compression and a radius twice the thickness of the composite.

EXAMPLE 37

A sheet of 15 inches by 14 inches hot rolled A-285 steel 0.75 inch thick was blanchard ground and placed on a supporting block of plywood. One surface of a 15 inches by 14 inches by 0.090 inch sheet of type A-55 titanium alloy, which had been annealed and descaled, was covered with masking tape and was placed, tape side up, over the mild steel plate and spaced therefrom a distance of 0.03 inch by supporting means. The tape-covered surface of the titanium sheet was then covered completely by a 0.75 inch thickness of an explosive consisting of 80/20 Amatol plus ½% Cab-O-Sil and having an explosive load of 10.1 to 12.0 grams per square inch. Initiation of the explosive was provided by positioning an electric blasting cap on the center of the explosive layer and the explosive was detonated.

The preceding procedure was performed again using A-55 titanium alloy sheet 15 inches by 14 inches by 0.090 inch which had first been annealed and then descaled, and, as a backer layer, a 15 inches by 14 inches by 0.75 inch sheet of hot-rolled type A-285 steel whose surface had been decarburized to a depth of 0.01 inch and provided with a belt-ground finish.

Once again the given procedure was performed. This time the cladding layer remained the same, i.e., A-55 titanium alloy which had been annealed and descaled, and the backer was a 16½ inches by 16¼ inches by ¾ inch sheet of hot rolled A-204 steel whose surface had been blanchard ground.

In each instance, the clads formed were examined as follows:

(a) The percent of bond by ultrasonic inspection was 98% minimum across the area of each interface.

(b) The shear strengths were determined by conventional means.

(1) As shot, they exhibited 45,000 p.s.i. minimum.

(2) After stress relief annealing, they exhibited 38,000 p.s.i. minimum.

(c) Compression Bend test (conventional) was performed on each with the clad under tension and compression and each could be bent 125° minimum around a mandrel, whose radius was twice the thickness of the clad, without separation.

(d) Standard Chisel tests were performed on each with good results—no separation.

(e) Each clad was hot rolled at from 1000 to 1400° F. with a 60% reduction in thickness and no separation.

(f) Each clad was cold rolled with a 22% reduction in thickness with no separation.

(g) Stress relieved clads of (b) above could be:

(1) Cold formed into severe flanged and dished heads without separation at the bond zone or cracking of the clad.

(2) Band sawed into pieces by cutting without a lubricant or coolant with the clad held in tension.

(3) Cut by oxy-acetylene torch without separation of the clad. This could be performed by cutting through the clad or from the backer surface with equal success.

(4) The clads could be successfully welded without clad separation.

The method employed to provide the required gap between the metal layers is not critical. As we have shown, tiny particles of metal interposed between the layers function quite satisfactorily. Also, small projections in the surface of the upper layer or small protrusions on the surface of the lower layer may be used. Obviously, the supporting means should not shield large areas of the surfaces of the metals if bonding at those areas is desired.

It is desirable that the metals be relatively free of surface impurities. Where surfaces are unclean, usually cleaning of the surfaces with a mild abrasive followed by flushing with a solvent is adequate to remove any impurities which would impair adhesion or result in brittle areas. However, the intense and elaborate cleaning operations required for other bonding methods are not necessary for the present process.

Rigid supporting means for the base layer is not critical to the practice of the invention; however, the presence of a supporting medium aids in avoiding distortion of the assembly formed. Plywood, because of its low cost, represents a satisfactory support material.

As demonstrated in the foregoing examples, in some cases it is advantageous to provide a layer of inert or buffer material such as polyester films, water, or a thin layer of tape between the explosive layer and the surface of the cladding metal as an aid in maintaining a smooth uncontaminated surface.

The explosive layer may be initiated by any conventional initiating device, e.g., blasting cap, detonating fuse, exploding wires, etc. The location of the initiation source on the explosive layer is not critical provided that the entire layer is not simultaneously initiated. Thus, the initiation source may be at a corner, which is preferred because of the larger bonded area which it provides, along an edge, or in the center of the explosive layer, or alternatively, a plurality of initiation sources or a line-wave generator may be used to initiate an entire edge of the layer simultaneously. The amount of explosive used is not critical, provided a sufficient loading is present to propel the layers with adequate velocity to achieve the desired bonding. The particular amount and loading of explosives suitable in any case will be readily apparent to one skilled in the art considering such factors as type of explosive, thickness of the metal layer, etc. Obviously, excessive explosive will cause undesired deformation and should be avoided.

Obviously, if desired, in order to conserve the amount of explosive required, a cladding assembly may be placed on both surfaces of the explosive layer. Thus, two clad systems may be prepared with a single operation.

Having described the invention fully in the foregoing, we intend to be limited only by the following claims.

What is claimed is:

1. A mill product comprising at least two metallic layers of different composition bonded together to form a composite system by a continuous bonding layer, said bonding layer being characterized by an abrupt change in composition across each interface therein and by the presence of homogeneous alloy intermediate in composition between said metallic layers, said system having a shear strength of greater than about 75% of that of the weaker metal in said system before cladding.

2. A mill product comprising two metallic layers of different composition bonded together to form a composite system by a continuous bonding layer, said bonding layer being characterized by an abrupt change in composition across each interface therein and by the presence of homogeneous alloy intermediate in composition between said metallic layers, said system being bonded over more than 90% of each interface and having a shear strength of greater than about 75% of that of the weaker metal in said system before cladding.

3. A planar multilayered bonded article comprising two metallic layers of different composition each having a minimum planar dimension of at least three inches bonded together to form a composite system by a continuous bonding layer, said bonding layer being characterized by an abrupt change in composition across each interface thereof and by discrete and relatively periodic regions having a composition substantially uniform throughout each region and intermediate between that of said layers, said regions being spaced between substantially continuous metal-to-metal bonding, said system being bonded over more than 90% of each interface and having a shear strength greater than about 75% of that of the weaker metal in said system before cladding.

4. The article of claim 2 wherein said bonding layer is a substantially continuous layer of said alloy.

5. The article of claim 2 wherein said bonding layer comprises discreate and relatively periodic regions of said homogeneous alloy spaced between substantially continuous metal-to-metal bonding.

6. The article of claim 5 wherein one of said metallic layers is of nickel and the other is of copper.

7. The article of claim 5 wherein one of said metallic layers is type 304 stainless steel and the other is low-carbon steel.

8. The article of claim 5 wherein one of said metallic layers is nickel and the other is mild steel.

9. The article of claim 5 wherein one of said metallic layers is copper and the other is low-carbon steel.

10. The article of claim 5 wherein one of said metallic layers is titanium and the other is copper.

11. The article of claim 5 wherein one of said metallic layers is aluminum and the other is low-carbon steel.

12. The article of claim 5 wherein one of said metallic layers in Hastelloy "C" and the other is low-carbon steel.

13. The article of claim 5 wherein one of said metallic layers is magnesium and the other is low-carbon steel.

14. The article of claim 5 wherein one of said metallic layers is titanium and the other is aluminum.

15. The article of claim 5 wherein one of said metallic layers is Inconel and the other is low-carbon steel.

16. The article of claim 5 wherein one of said metallic layers is Nichrome and the other is molybdenum.

17. The article of claim 5 wherein one of said metallic layers in molybdenum and the other is low-carbon steel.

18. The article of claim 5 wherein one of said metallic layers is titanium and the other is steel.

19. The article of claim 5 wherein one of said metallic layers in stainless steel and the other is molybdenum.

20. The article of claim 5 wherein one of said metallic layers in titanium and the other is Inconel.

21. The article of claim 5 wherein one of said metallic layers is copper and the other is steel.

22. The article of claim 5 wherein said layers are alternating layers of austenitic stainless steel and low-carbon steel.

23. The article of claim 5 wherein one of said metallic layers is silver and the other is low-carbon steel.

(References on following page)

References Cited by the Examiner

UNITED STATES PATENTS

| | | | |
|---|---|---|---|
| 2,484,118 | 10/1949 | Reynolds | 29—196.1 |
| 2,731,403 | 1/1956 | Rubin | 29—196.6 |
| 2,745,172 | 5/1956 | Townsend | 29—196.1 |
| 2,844,868 | 7/1958 | Cline et al. | 29—198 |
| 2,854,739 | 10/1958 | Bartlett et al. | 29—198 |
| 2,856,682 | 10/1958 | Chyle | 29—196.1 |
| 2,941,289 | 6/1960 | Choce | 29—196.1 |
| 2,946,120 | 7/1960 | Jones et al. | 29—470.1 |
| 2,985,954 | 5/1961 | Jones et al. | 29—470.1 |
| 2,998,642 | 9/1961 | McCawley | 29—196 |
| 3,024,526 | 3/1962 | Philipchuk et al. | 29—470 |
| 3,031,746 | 5/1962 | Ciarleglia et al. | 29—470.1 |
| 3,045,333 | 7/1962 | Pinlay | 29—197 |
| 3,066,392 | 12/1962 | Kanter et al. | 29—196.2 |
| 3,101,634 | 8/1963 | Cooper | 29—470.1 |

DAVID L. RECK, *Primary Examiner.*

HYLAND BIZOT, *Examiner.*